United States Patent
Rowland-Hill

[15] 3,669,121
[45] June 13, 1972

[54] AXIAL FLOW THRESHING AND SEPARATING MEANS WITH A LOAD DISTRIBUTING THRESHING ROTOR

[72] Inventor: Edward William Rowland-Hill, Lancaster, Pa.

[73] Assignee: Sperry Rand Corporation, New Holland, Pa.

[22] Filed: June 30, 1970

[21] Appl. No.: 51,082

[52] U.S. Cl. ......................................................... 130/27 T
[51] Int. Cl. ................................................................ A01f 7/06
[58] Field of Search ................................. 130/27 T, 27, 23, 6

[56] References Cited

UNITED STATES PATENTS

| | | |
|---|---|---|
| 2,050,631 | 8/1936 | Schlayer ............................... 130/27 T |
| 3,536,077 | 10/1970 | Stott et al. .................................. 130/6 |
| 2,745,409 | 5/1956 | Tillotson ............................. 130/27 T |
| 1,174,398 | 3/1916 | Davis.................................... 130/27 T |
| 1,781,472 | 11/1930 | Nagle ..................................... 130/27 T |
| 1,534,426 | 4/1925 | Strong et al. ......................... 130/27 T |
| 3,481,343 | 12/1969 | Van Buskirk........................ 130/27 T |

Primary Examiner—Antonio F. Guida
Attorney—Joseph A. Brown, John C. Thompson, James J. Kennedy and George C. Bower

[57] ABSTRACT

An axial flow threshing and separating rotor of an agricultural combine has a plurality of axially extending threshing means circumferentially arranged to enter the threshing zone at different times for distribution of the threshing load.

6 Claims, 3 Drawing Figures

PATENTED JUN 13 1972 3,669,121

INVENTOR
EDWARD WILLIAM ROWLAND-HILL
BY
ATTORNEY
George C. Bower 3,669,121

AXIAL FLOW THRESHING AND SEPARATING MEANS WITH A LOAD DISTRIBUTING THRESHING ROTOR

BACKGROUND OF THE INVENTION

This invention relates to axial flow type threshing units on mobile combines and is directed particularly to a distribution of the threshing load of a rotor on sweeping across the concave.

The rotors of axial type combines are generally oval or elliptical in shape with the threshing members diametrically positioned on opposite axially extending edges of the rotors. The threshing members sweep across axially extending concaves to thresh the harvested crop. Spaces between the sides of the oval or elliptical shaped rotor and the cylindrical casing receive the harvested crops in front of the forward portion of the rasp bars of the rotor. The initial threshing action occurs over this forward portion and the rotor carries the material around and sweeps the crop material across the concaves for successive threshing and separating actions. On each action the crops are rubbed by the rasp bars of the threshing members across the concaves. Heretofore the axially extending threshing members or rasp bars each enter the concave along its total axial length. The axially distributed threshing loads of each member are presented to the drive means at the same time and a power surge occurs. These power surges are reflected back through the drive system resulting in an uneven operation. This uneven operation may be in the form of a thumping sound and vibration of the combine, particularly parts adjacent the thresher. Such noise and vibration is unacceptable. Continuously operating machines should operate smoothly.

It is therefore very desirable to reduce these power surges and repetitive loadings on the drive system and to operate the combine more evenly and smoothly.

SUMMARY OF THE INVENTION

The object of the invention is to reduce or eliminate the power surges of an axial flow type threshing and separating rotor produced by the threshing action.

Another object of the invention is to provide smoother delivery of power to a threshing rotor and reduce peak loadings on the drive system.

In summary an axial type threshing and separating rotor has the axial threshing means of the threshing rotor entering the threshing zone over an interval of time to distribute the threshing loads.

DETAILED DESCRIPTION OF A PREFERRED EMBODIMENT OF THE INVENTION

Figure 1:
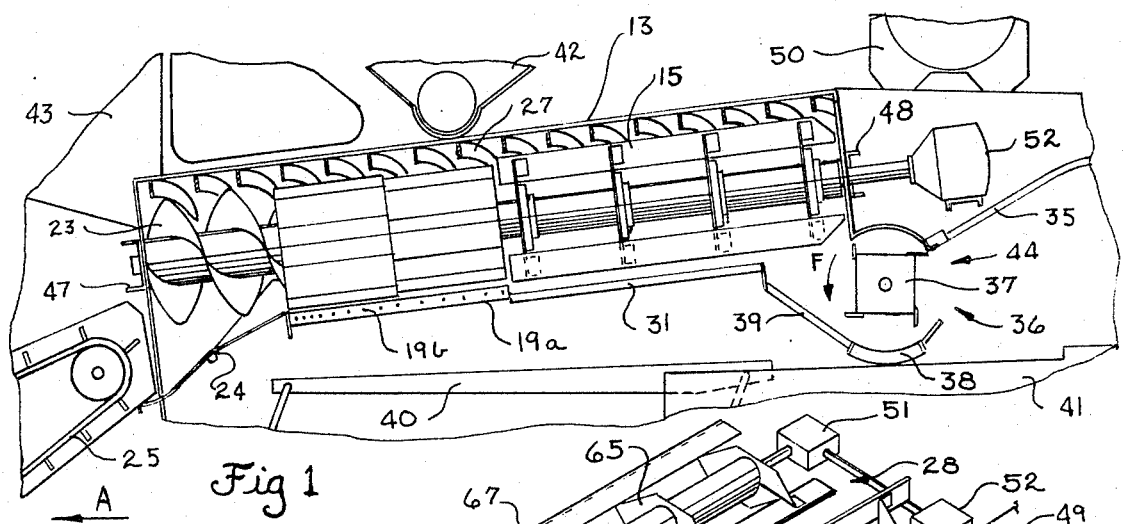
FIG. 1 is a side view of the left rotor with the casing shown in section.

The description of this invention is in connection with a mobile self-propelled axial flow type combine having threshing and separating units 10, 11 in side by side relation extending longitudinally in the direction of combine travel indicated by the arrow A (FIG. 1). The threshing and separating units comprise cylindrical casings 12, 13 and rotors 14, 15 extending axially therein. The combine is fragmentarily shown in FIG. 1 from the left hand side. The harvested crop material received from a conventional undershot crop conveyor or elevator 25 is delivered intermediately to the underside of the auger flights 20–23 on the rotors by a ramp 24 extending upwardly and rearwardly and across the width of the combine and crop elevator. The auger flights 20–23 deliver the crop material to the threshing and separating means 16, 17. The grain is separated from the crop material by the threshing action between the threshing and separating means 16, 17 and the concaves 18, 19. The straw in mat form is moved rearward by the vanes 26, 27 through successive threshing actions and then delivered to the separating means 28, 29. The separating means removes the threshed grain entrained in the straw mat in cooperation with the grates 30, 31 and the straw mat is discharged at the rear of the separating means through a bottom opening 36. The rotary beater 37 discharges the straw from the combine.

The grain pan 40 under the threshing and separating means 16, 17 and the cleaning means 41 under the grates 30, 31 may be of conventional types. The clean threshed grain is briefly stored in the grain tank 42 on top of the combine for delivery to grain trucks, wagons or the like. A platform and cab 43 is fragmentarily indicated on the front of the combine above the crop elevator for the operator driving the combine.

The center rear discharge beater 37 extends across the width of the combine and the rear opening 36. The straw drops onto the feed plate 39 and is swept across the grate 38 by the beater turning in the direction F. The beater then forcefully discharges the straw from the rear edge of the grate and out of the combine. A straw deflector plate 35 extends upwardly and rearwardly from the upper edge of the discharge opening 44. The beater has four blades mounted on a rectangular frame which is symmetrical about the axes of rotation. A final separating action is obtained in the reorientation of the straw as it falls on the feed plate and is swept across the grate 38. Separated grain drops through the grate into the cleaning means 41.

The concaves 18, 19 are semicylindrical in shape and extend over an arc slightly less than a third of the circumference of the casing. The bars 18a, 19a of the concaves extend longitudinally or axially parallel to the axes of the respective rotors. The circumferential rods or wires 18b, 19b extend transversely through the bars to divide the slots formed by the bars into rectangular openings. The concave structure is shown as about 110°. However the active threshing arc or angle D is about 90°.

Figure 2:
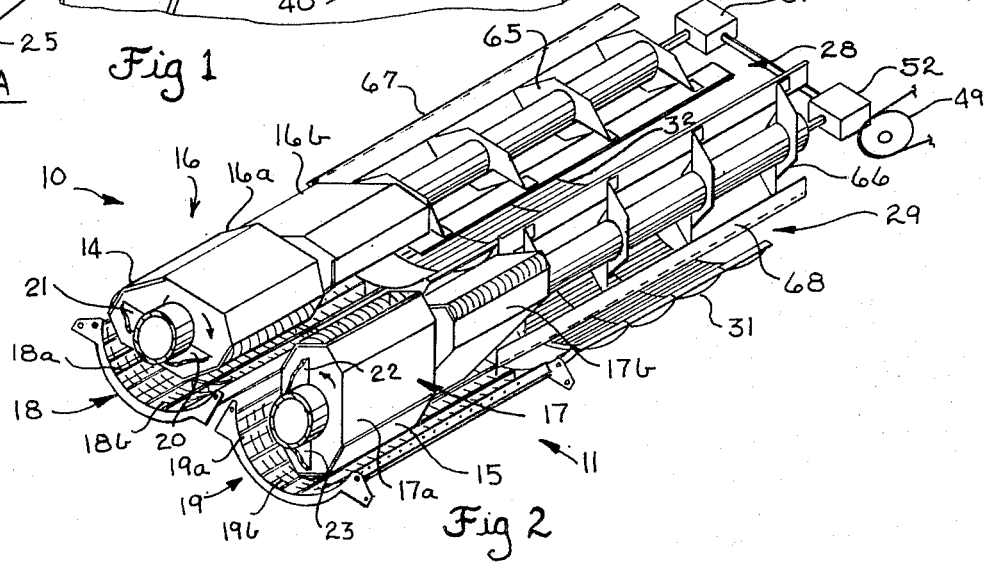
FIG. 2 is a perspective view of the two rotors with the feed augers fragmentarily shown.
Figure 3:
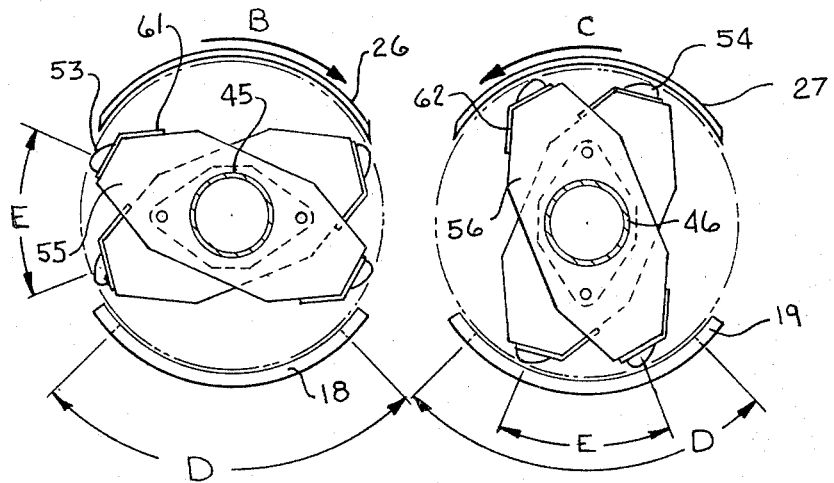
FIG. 3 is a front end view of the threshing and separating rotor without the proceeding feed augers and the concaves diagrammatically shown.

The particular feature of this invention is the dividing of the threshing and separating means into forward portions 16a, 17a and rear portions 16b, 17b and the timed cooperative relation between the twin rotors and respective concaves. This relationship end structure is best illustrated in FIGS. 2 and 3. The rotors have tubular members 45, 46, respectively, which are rotatably mounted in the front and rear transverse horizontal beams 47, 48 extending across the width of the combine. The tubular members and rotors are driven by the engine 50 on top of the combine through gear boxes 51, 52 by a drive means 49 partially illustrated in FIG. 2. The rotors are driven in opposite directions to sweep downwardly at the inner and adjacent sides of the rotors. The left rotor is driven counterclockwise and the right rotor is driven clockwise as indicated by he arrows B and C, respectively, in FIG. 2. As best seen in FIGS. 2 and 3 the separating and threshing means have generally oval or elliptical shapes and form spaces between the casings and the respective forward portions and rear portions. The forward portions and rear portions are axially straight and circumferentially positioned out of alignment by an angle E. The flights of the augers at the forward rotor portions terminate in line with the long dimension of the rotor to deliver the crop materials in advance of the threshing members or rasp bars 53, 54 on the ends of the rotor. The flights of the forward feed augers are only fragmentarily shown for a clearer presentation of the features of this invention and have been omitted from FIGS. 3 and 4.

The forward and rear portions of the threshing and separating means have a plurality of arms 55, 56 mounted on the tubular member and extending radially therefrom and supporting side panels of sheet metal to enclose the rotor and arms. In the embodiment shown, the threshing members or rasp bars 53, 54 are mounted on reinforcing plates 61, 62. The separating means also comprise a plurality of arms or radial supports 65, 66 fixedly mounted on the tubular members 45, 46 and longitudinally supporting in a radial plane paddles or blades 67, 68 which sweep across the separator grates to agitate the straw mat and dislodge entrained grain.

As previously mentioned the portions of the threshing and separating means are circumferentially spaced at an angle E. This angle E is preferably in the order of 45° for a threshing concave angle D in the order of 90°. The respective forward and rear portions of the threshing and separating means of the two rotors are positioned 90° out of phase in relation to one another.

As previously mentioned the purpose of this invention is to reduce the peak threshing load and provide a smooth operating combine. Considering this feature in detail and the relationship of the timing of the various rasp bars on the forward and rear portions, it is seen, from FIG. 2, that the right threshing and separating means 16 is not in threshing relationship with the respective concave 18 whereas the left threshing and separating means 17 is in threshing relationship with the respective concave 19. When the two threshing or separating means have turned 90° the right threshing and separating means 16 will be in threshing relation with the concave 18 and the left threshing and separating means 17 will be out of threshing relationship. Thus, the two threshing and separating means alternately present a threshing load to the drive system and engine. This greatly reduces the maximum power required to be expended by the engine. In addition, the circumferential offset of the forward and rear portions has the rasp bars on the forward portions lead the rasp bars on the rearward portions. On entering into a threshing relation with the respective concaves the rasp bar on the forward portion is about to sweep across the concave while the trailing rasp is approaching the concave area and enters 45° later than the leading rasp bar. The leading rasp bar will have completed a substantial portion of the threshing action before the trailing rasp bar enters into a threshing relation with the concave. The heaviest threshing load occurs during the initial stages of the threshing action. By having the leading and trailing rasp bars in this initial threshing relation, the load applied by this action to the drive system and the engines is reduced in its maximum amount and distributed to lessen the surges of power through the drive system. Also the threshing impact is reduced since it occurs in two separated instances. When the threshing and separating means are at 45° angles to the horizontal the trailing rasp bar of one threshing and separating means will be leaving the threshing relation with a respective concave, at the same time that a leading rasp bar of the other threshing and separating means is entering the threshing relation. Thus, there will be two rasp bars in threshing relation. This assists in balancing the loads applied to he respective drives of the drive system.

It will be appreciated that since the completely unthreshed harvested crop is fed to the forward portions of the threshing and separating means that the leading rasp bars will carry a greater threshing load than the trailing rasp bars which threshes the crop material after it has been more or less formed into a straw mat. The straw mat revolves around the casing four or five times depending upon the number of vanes in the top walls of the casing. The threshed straw mat is then discharged to the separator where it continues to move circumferentially around the casing while being moved axially rearward by he vanes. The crop material in the form of a straw mat passes through the threshing and separating units in 2 to 3 seconds which is substantially less than conventional combines. The capacity of the threshing and separating units is high and the operation of the combine is smooth and even.

It is seen from the foregoing description that the loading of the threshing action on the drive system may be spread out over the period of rotation so as to avoid or reduce any excessive loads on the engine and drive system. This circumferential positioning of one portion of the threshing rotor from the other portion distributes the total power requirements of the engine more evenly over a complete rotation of the rotors of the twin threshing and separating units.

While the invention has been described, it will be understood and is capable of further modifications and this application is intended in general to cover any variations, uses, or adaptations of the invention and including such departures from the present disclosure has come within known or customary practice in an art to which the invention pertains, and as may be applied to the essential features hereinbefore set forth as forward in the scope of the invention or the limits of the appended claims.

Having thus described my invention what I claim is:

1. An axial threshing and separating machine comprising two axial flow threshing and separating units extending in side-by-side relation each having casing means with axially extending cylindrically curved concave and having rotor means extending axially through said respective casing means and with axial threshing means circumferentially arranged around said respective rotor means to sweep across said concaves in threshing relation therewith, said threshing means on one of said rotor means being out of phase with said threshing means on the other of said rotor means, and each of said threshing means of said rotor means being two discrete forward and rear axially straight portions offset circumferentially in non-overlapping relation to enter into threshing relation with the concaves at different times whereby the initial threshing loadings of a given threshing means is applied to said rotors at intervals, the forward portion at the crop receiving end of said rotor means first threshing the crop and the rear portion subsequently threshing the previously threshed crop.

2. An axial threshing and separating machine as set forth in claim 1 wherein said forward portions of said threshing means leads said respective rear portion.

3. An axial threshing and separating machine as set forth in claim 2 wherein said threshing portions of said concaves are about 90° and said forward and rear discrete portions of each threshing means are spaced circumferentially 45° apart.

4. An axial threshing and separating machine comprising two axial flow type threshing and separating units extending in side-by-side relation each having casing means and rotor means, said concaves extending axially and being cylindrically curved over an arc of about 90°, said rotor means extending axially through said respective casing means and having elliptical shapes for threshing along diametrically opposite edges, drive means for rotating said rotor means downward at adjacent sides and out of phase threshing relation with said respective concaves in opposite directions, characterized by said rotor means being each longitudinally divided into a first axially straight part and a second axially straight part, said second part circumferentially offset 45° to enter into threshing relation with said respective concave after said first part to divide the application of the threshing load to said drive means for smoother operation of said machine.

5. An axial threshing and separating machine comprising an axial type threshing and separating unit having casing means with an axially extending cylindrically curved concave and also having rotor means extending axially through said respective casing, the rotor means having axially extending threshing means circumferentially arranged around said rotor means to sweep across the concave in threshing relation therewith, each of the circumferentially arranged threshing means having two discrete forward and rear axially straight portions offset circumferentially with respect to each other in non-overlapping relationship to enter into threshing relation with the concave at different times whereby the initial threshing loading of a given threshing means is applied to said rotor at intervals, the forward portion at the crop receiving end of said rotor means first threshing the crop and the rear portion subsequently threshing the previously threshed crop.

6. An axial threshing and separating machine comprising two axial flow type threshing and separating units extending in side-by-side relation, each unit having casing means with an axially extending cylindrically curved concave, and rotor means extending axially through said casing means and having axial threshing means circumferentially arranged around said rotor means to sweep across said concave in threshing relation therewith, the forward end of each of the threshing means being offset circumferentially from the rear end of the same threshing means to enter into threshing relation with the concave at different times whereby the initial threshing loading of a given threshing means is minimized, the forward end of the threshing means first threshing the crop and the rear end of the same threshing means subsequently threshing the previously threshed crop, said threshing means on one of said rotors being out of phase with the threshing means on another of said rotors whereby the rear end of the threshing means on said one rotor enters into threshing relation with its concave before the forward end of the threshing means on said other rotor enters into threshing relation with its concave.

\* \* \* \* \*